Figure 9:
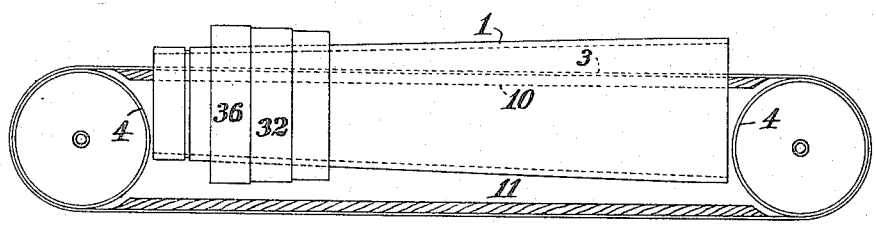

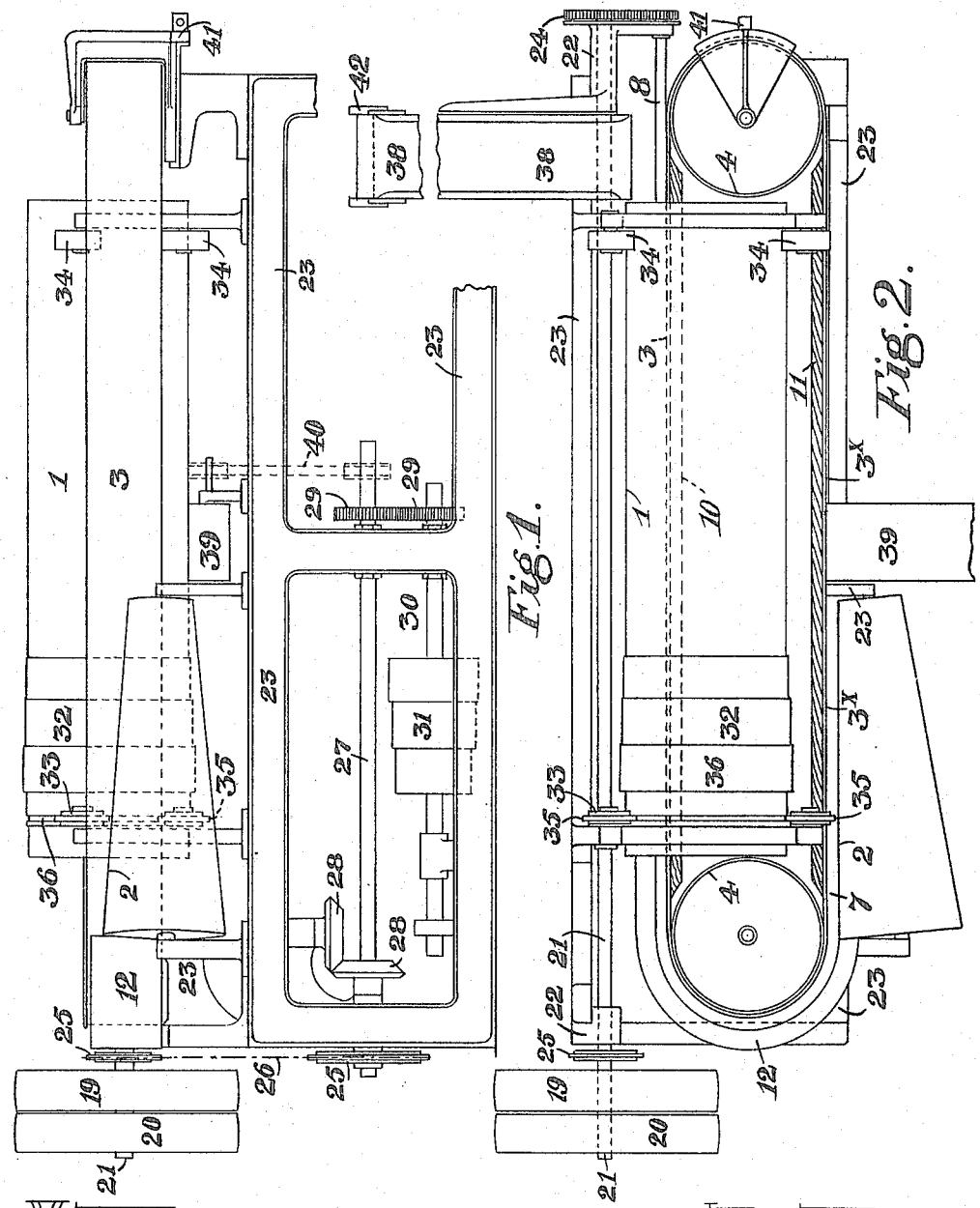

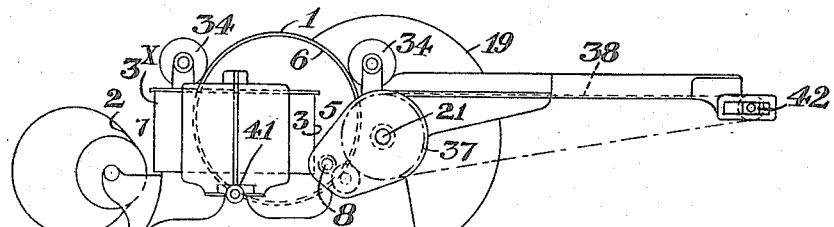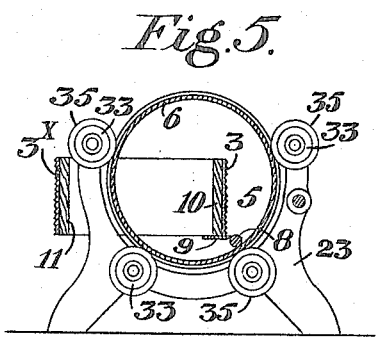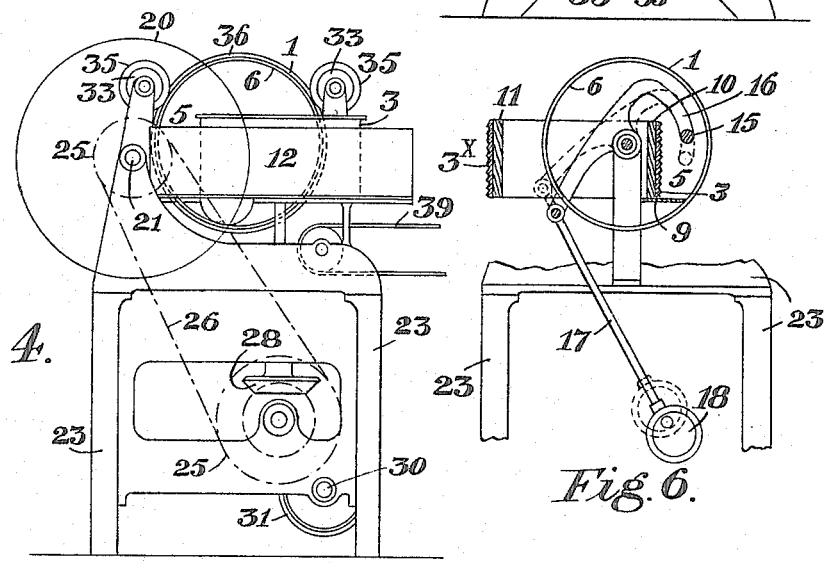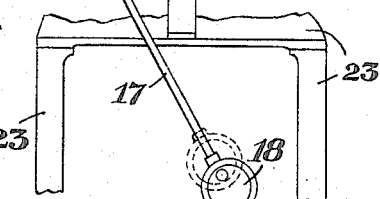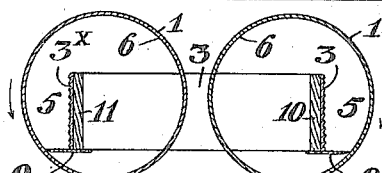

J. CALLOW.
APPARATUS FOR MOLDING, SHAPING, AND COMPRESSING DOUGH AND LIKE PLASTIC MATERIALS.
APPLICATION FILED APR. 2, 1909.

1,131,328.

Patented Mar. 9, 1915.
3 SHEETS—SHEET 3.

UNITED STATES PATENT OFFICE.

JOHN CALLOW, OF LIVERPOOL, ENGLAND.

APPARATUS FOR MOLDING, SHAPING, AND COMPRESSING DOUGH AND LIKE PLASTIC MATERIALS.

1,131,328.

Specification of Letters Patent.

Patented Mar. 9, 1915.

Application filed April 2, 1909. Serial No. 487,457.

*To all whom it may concern:*

Be it known that I, JOHN CALLOW, a subject of the King of Great Britain, residing at Liverpool, in the county of Lancaster, in the Kingdom of England, have invented certain new and useful Improvements in Apparatus for Molding, Shaping, and Compressing Dough and like Plastic Materials, of which the following is a specification.

This invention relates to molding, pressing and shaping dough or like plastic material into lumps of suitable size and weight, and has for its object the effecting of the same by mechanical means, the dough being submitted to a treatment which expels the gases from it, and while molding it continually draws the skin tight over the lump being treated.

An embodiment of my invention is shown in the accompanying drawings, in which,

Figure 1 is a side elevation of the machine; Fig. 2, a plan view; Fig. 3, an end view taken at the right hand of Figs. 1 and 2; Fig. 4, an end view taken at the left hand of Figs. 1 and 2; Fig. 5, a cross section through the molding cylinder; Fig. 6, a sectional end elevation of the internal molding cylinder, showing the press or basher inside which descends on the dough so as to strike the same on the top; Fig. 7, a sectional elevation of the delivery device with hood, to cause a rolling of the dough lumps after they are delivered from the molder; Fig. 8, a cross section showing two internal molding cylinders. Fig. 9 is a diagrammatic view similar to Fig. 2, but showing a tapered internal molding cylinder.

Referring to these drawings, I provide two molding rollers or drums. One of these, 1, is a hollow internal molding cylinder, while the other, 2, is an external molding roller.

3 is the carrier which passes around guide pulleys 4 set at a suitable distance apart, and arranged to pass through the internal molding cylinder 1, so as to form an internal molding trough 5, in such a manner that the internal periphery 6 of the cylinder in rotating, with the carrier 3 traveling through it, will so act on the dough, as to set up a combined folding rolling and squeezing action on all sides, which action will serve the purpose of molding, and of expelling the gases. The return length $3^\times$ of the carrier 3, passes outside the other or external roller 2 so as to form an external molding trough 7. The small roller 8, Fig. 3, is arranged at the edge of the carrier 3 for the purpose of stripping the internal periphery 6 of the roller 1 of any adhering dough, and rotating in such a direction and speed as to prevent the dough escaping at the bottom of the trough 5. In addition the roller 8 improves the closing of the dough. The roller 8 is also provided in Fig. 5 with a scraper 9 for stripping the roller 8 of any adhering dough, or the roller 8 could be dispensed with and the scraper 9 used alone (Fig. 6) for stripping the internal periphery 6 of adhering dough. This roller 8 or scraper 9 is located immediately at the edge of the carrier, or in some position preferably close to the internal periphery 6 of the cylinder 1, or the scraper 9 may be arranged with its edge against the internal periphery, while the carrier 3, being placed on the inside of the cylinder 1, the concavity, that is the interior periphery 6 of the cylinder 1, acts on the dough instead of the convexity, that is to say, its outside periphery. The return length $3^\times$ of the carrier 3 in the application of the invention I am now describing, passses in proximity to the outer periphery of the roller 2, and thus forms an external molding trough 7. My reason for employing the internal molding cylinder is, that the concavity gets more around the piece of dough than the convexity, and therefore gives better results. The external molding roller 2 may be made taper as shown, so that its surface speed, is greater at one end than at the other, and the dough is fed in at the larger end where the surface speed is greatest. The dough is molded at this end with greater speed and force, and as the dough travels along the trough 7, toward the smaller end, where the surface speed is less, it is more gently treated, this being just what is required on account of its stretching properties being reduced, through the gases being squeezed out, and thus a better result is obtained by molding gently at the finish. The roller 2 can be mounted so that its molding surface is parallel to the returning length $3^\times$ of the carrier, as shown in Fig. 2, or at an angle, as shown in Fig. 3.

10 is a backing against which the carrier 3 rests as it travels through the interior of the cylinder 1, and 11, a similar backing for the returning length, the object of which is to resist sagging of the carrier between the guide pulleys 4.

12 is a stationary trough curving around the carrier pulley 4 to form a molding trough, for the interval between the delivery end of the internal molding cylinder 1, and the receiving end of the external molding roller 2. The carrier 3 can be provided with flexible ribs, Figs. 5 and 6, which are secured thereto and arranged in an oblique position. As the lumps of dough are rolled along the trough 5 by the travel of the carrier, they are further acted upon by means of a press or ram 15, which descends on to the dough so as to strike the same at the top and exert pressure on it. In the drawings this press or ram 15 consists of a roller mounted on a pivoted bracket 16, which is constantly given an oscillating movement by means of the rod 17 operated by the eccentric 18. Thus the roller 15 acts as a beater, which constantly presses the dough down in the trough 5.

All the moving parts of the machine are connected with a series of gearing, so as to be driven from a single prime mover, such as a driving pulley 19, which, together with the loose pulley 20, is mounted on the driving shaft 21 supported in bearings 22 on the frame 23. The driving shaft 21 gives rotation by the gears 24 to the roller 8, and by the sprocket wheels 25 and chain 26 to the shaft 27. This shaft 27, by means of the bevel wheels 28, drives the carrier pulley 4, and by means of the gears 29, the shaft 30 and cone pulley 31. On the outside of the cylinder 1 is secured the cone pulley 32, by which the said cylinder is driven by a belt from the cone pulley 31. The cylinder 1 is mounted on bearing rollers 33 and 34, and the peripheries of 33 have a rib 35 which engages a groove 36 on the roller 1 and resist longitudinal movement. These bearing rollers are mounted in the frame 23. The shaft 21 also drives the pulley 37 of the feeding conveyer 38, and the shaft 27 the delivery conveyer 39, by the driving gear 40. By means of the tightening gear 41 the conveyer 3 can have its slack taken up, and the slack in the feeding conveyer 38 can be taken up by the tightening gear 42.

Hitherto the most satisfactory dough molding machines turned out the finished lump of dough somewhat in the form of a peg-top or inverted cone shape, which is well suited for the making of cottage loaves, but not for tin or elongated bread, which requires a more or less rolled or cylindrical form. By the present invention, the lumps of dough of peg-top or inverted cone shape, can be so treated as to be converted into the cylindrical form desired. For this purpose the traveling conveyer 39 is arranged in proximity to the delivery end of the trough 7, in such a way as to receive the lumps of dough issuing therefrom. This conveyer 39 is located somewhat below the mouth of the trough 7, so as to give the lumps of dough time to turn over, so that the closing of the dough points upward, when the lump is at rest on the conveyer 39. Over the conveyer 39 is a hood or guide piece 44 suitably adjustable as to height, and with a preferably slightly raised end (Fig. 7). The band 39 brings the lumps of dough with the closing upward, under the guide or hood 44, which latter presses down on the belt, so as to cause a rolling of the lump, which will issue from under the hood or guide 44 in the form of a cylinder suitable for the purpose required. Although stress has been laid on the lumps of dough falling with the closing upward, this is not essential, so long as they fall with the closing approximately at right angles to the axis of the finished cylinder or roll.

The general operation of the machine may be briefly summarized as follows: The conveyer or carrier 3, and the cylinder 1, and roller 2, being set in motion, the lumps of dough are fed in at one place by the feeding conveyer 38, and are fed by the carrier 3 into the interior of the hollow cylinder 1. The combined actions due to the moving carrier 3 at one side of the trough 5, (which can if desired be provided with oblique ribs), and the opposing inner periphery of the rotating cylinder 1, act to constantly feed the lumps, and pull the outer skin of the same downward toward the bottom of the trough 5 and fold the dough, also draw the skin toward the closing of the molded piece. Thus a combined folding, rolling and squeezing action is set up, while the dough being constantly forced to rotate, will receive pressure on all sides, which action will serve the purpose of molding the dough and expelling the gases. The progression of the dough lumps continues around the carrier guide pulleys 4 at one end of the machine, and then they commence to travel along the returning length of the carrier $3^x$. Here they are acted upon by the molding action of the external roller 2, and the opposing surface of the carrier $3^x$, and these also act to constantly feed the lumps and pull the outer skin of the same downward, toward the bottom of the trough, and fold the dough, also draw the skin toward the closing of the molded piece. Finally the lumps are discharged on to the delivery conveyer 39.

In thus describing the invention, I wish it to be understood that the external molding roller 2 can be dispensed with, and the internal molding periphery of the roller 1 relied on only to mold the dough, in which case of course the roller 2 is omitted. Or a pair of internal molding cylinders 1 can be used (Fig. 8) in which case the carrier 3 passes in one direction through one of the cylinders 1, and returns through the other, forming two internal molding troughs 5.

I declare that what I claim is:—

1. Apparatus for forming plastic material, comprising a rotating hollow drum; a conveyer moving longitudinally within it having a continuous surface adapted to support a mass of dough adjacent to one side of the drum; means adapted to push such mass against said adjacent side of the drum.

2. Apparatus for forming plastic material comprising a rotating hollow drum; a conveyer moving longitudinally through the drum and adapted to support a mass of dough; and means to push said mass into the angle formed by the juxtaposition of said carrier and the side of said drum.

3. Apparatus for forming plastic material comprising a rotating hollow drum, a conveyer moving longitudinally through the drum and a pusher reciprocating over the conveyer toward and from the line where the conveyer and the drumside are adjacent.

4. The combination of rotating hollow drum and a conveyer moving longitudinally through it having a continuous surface adapted to support a mass of dough adjacent to one side of the drum, and a scraper fixed between the drum-side and the conveyer and adapted to act upon the interior surface of the drum.

5. The combination of a rotating hollow drum, a stiff plate fixed within it adjacent to its inside wall, a flexible belt, and means to draw the belt longitudinally through the drum, the plate supporting the belt; and a pusher reciprocating over the belt toward and from the line where the conveyer and drum wall are adjacent.

6. In a dough molding apparatus the combination of a hollow axially rotated cylinder, an external tapered molding roller in proximity thereto, and an endless carrier passing around guide pulleys so placed that one run of the carrier passes longitudinally through the cylinder to form an internal molding trough while the other run passes in proximity to the roller to form an external molding trough.

7. In dough molding apparatus the combination of a hollow axially rotated cylinder, an external molding roller in proximity thereto, an endless carrier passing around guide pulleys so placed that one run of the carrier passes longitudinally through the cylinder to form an internal molding trough, while the other run passes in proximity to the roller to form an external molding trough, a conveyer adjacent the exit end of said external molding trough, and a molding board mounted over said conveyer.

8. In dough molding apparatus the combination of a hollow axially rotated cylinder, a traveling carrier traversing the interior of said cylinder in a longitudinal direction, and stripping means adjacent the inner surface of the cylinder and the edge of the carrier.

9. In a dough molding apparatus the combination of a hollow axially rotated cylinder, a traveling carrier traversing the interior of said cylinder in a longitudinal direction, and a stripping roller adjacent the inner surface of the cylinder and the edge of the carrier.

10. In a dough molding apparatus the combination of a hollow axially rotated cylinder, a traveling carrier traversing the interior of said cylinder in a longitudinal direction, a stripping roller adjacent the inner surface of the cylinder, and a scraper bearing on the stripping roller.

11. In dough molding apparatus the combination of a hollow axially rotated cylinder, a traveling carrier traversing the interior of said cylinder in a longitudinal direction and forming a molding trough with the inner surface of said cylinder, a pressure member within the cylinder and means for reciprocating said member whereby blows are imparted to the material in the trough.

12. In dough molding machines, the combination with an internal molding cylinder, an external molding roller in proximity thereto, and an endless carrier passing around guide pulleys so placed that at one part the carrier passes longitudinally through the cylinder to form an internal molding trough, while at another part it passes in proximity to the other roller to form an external molding trough.

13. In dough molding machines comprising an internal molding cylinder, an endless carrier passing through the same to form an internal molding trough for the forwardly traveling dough lumps, an external molding roller located in proximity to the returning length of the carrier to form an external molding trough, guide pulleys around which the carrier travels, and a stationary trough curving around the carrier pulley to form a molding trough in the interval between the delivery end of the internal molding cylinder and the receiving end of the external molding roller.

14. A dough molding machine comprising a rotating hollow cylinder, a carrier traveling within said cylinder, and a backing for said carrier arranged to prevent said carrier sagging and keep it at a uniform distance from the internal walls of the cylinder.

15. A dough molding machine comprising a hollow cylinder, a carrier traveling within said cylinder, and a rotary driven roller located at the edge of the carrier for the purpose of stripping the internal periphery of the roller of any adhering dough, and rotating in such a direction and speed as to prevent the dough escaping at the bottom of the trough formed by the juxtaposition of said carrier and said cylinder.

16. A dough molding machine comprising a hollow cylinder, a carrier traveling within said cylinder and forming an internal molding trough therewith, and means to prevent the dough escaping from the bottom of said molding trough.

17. A dough molding machine comprising a rotating cylinder, an endless carrier traveling within said cylinder so as to form a molding trough therewith, a delivery conveyer arranged in proximity to the mouth of said molding trough, and a hood or guide piece above said conveyer to press on the lumps of dough on the conveyer, so as to roll said lumps into solid cylinders.

18. Apparatus for molding plastic material comprising a hollow cylinder, a conveyer, means to move said conveyer longitudinally through said cylinder while forming therewith a molding trough of less than half the volume of said cylinder, and means to feed the material into said molding trough.

19. Apparatus for forming plastic material, comprising a hollow cylinder and a conveyer traveling longitudinally through said cylinder so as to form a molding trough therewith, one side of said molding trough being formed by said conveyer and the other side of said molding trough being formed by less than half of the periphery of the cylinder.

20. Apparatus for forming plastic material comprising a rotating hollow cylinder, a conveyer moving longitudinally through said cylinder, said conveyer being of such dimensions and fixed in such a position, that it lies with respect to said cylinder in the position of a portion only of a chord with respect to the cylinder section as a circle, and means to feed the material into the molding trough formed between said conveyer and the wall of said cylinder.

21. Apparatus for molding plastic material comprising a rotating hollow cylinder, a conveyer, means to move said conveyer longitudinally through said cylinder while forming therewith a molding trough of less than half the volume of said cylinder, and means to feed the material into said molding trough.

22. Apparatus for forming plastic material comprising a rotating hollow cylinder and a conveyer traveling longitudinally through said cylinder so as to form a molding trough therewith, one side of said molding trough being formed by said conveyer and the other side of said molding trough being formed by less than half of the periphery of the cylinder.

23. Apparatus for forming plastic material comprising a rotating hollow tapered cylinder and a plane conveyer moving longitudinally through said cylinder so as to form a molding trough therein.

24. Apparatus for forming plastic material comprising a rotating hollow tapered cylinder, a conveyer moving longitudinally through said cylinder, said conveyer being of such dimensions and fixed in such a position, that it lies with respect to said cylinder in the position of a portion only of a chord with respect to the cylinder section as a circle, and means to feed the material into the molding trough formed between said conveyer and the wall of said cylinder.

25. Apparatus for molding plastic material comprising a rotating hollow tapered cylinder, a conveyer, means to move said conveyer longitudinally through said cylinder while forming therewith a molding trough of less than half the volume of said cylinder, and means to feed the material into said molding trough.

26. Apparatus for molding plastic material comprising a hollow tapered cylinder, means to rotate said cylinder on a substantially horizontal axis, a conveyer forming a molding trough therewith, and means to move said conveyer longitudinally through said cylinder in a substantially vertical plane.

27. Apparatus for forming plastic material comprising a rotating hollow tapered cylinder and a conveyer traveling longitudinally through said cylinder so as to form a molding trough therewith, one side of said molding trough being formed by said conveyer and the other side of said molding trough being formed by less than half of the periphery of the cylinder.

28. Apparatus for forming plastic material comprising a hollow cylinder, a conveyer moving longitudinally through said cylinder so as to form a molding trough therewith, and means for producing a second molding trough through which the material shall pass comprising the rotating surface of a roller in juxtaposition to the surface of a conveyer moving longitudinally with respect to said roller.

29. Apparatus for forming plastic material comprising a hollow cylinder, a conveyer moving longitudinally through said cylinder so as to form a molding trough therewith and means for producing a second molding trough through which the material shall pass comprising the rotating surface of a roller in juxtaposition to the surface of a conveyer moving longitudinally with respect to said roller, at least one of the members including said cylinder and said roller being made tapering.

30. Apparatus for forming plastic material comprising a hollow cylinder, a conveyer moving longitudinally through said cylinder so as to form an internal molding trough therewith, and a rotating tapering roller arranged so as to form an external molding trough in conjunction with said conveyer.

31. Apparatus for forming plastic material comprising a hollow cylinder, a conveyer moving longitudinally through said cylinder so as to form an internal molding trough therewith, and a rotating roller arranged so as to form an external molding trough in conjunction with said conveyer, at least one of the members including said cylinder and said roller being tapering.

In witness whereof, I have hereunto signed my name this 23rd day of March 1909, in the presence of two subscribing witnesses.

JOHN CALLOW.

Witnesses:
G. C. DYMOND,
T. S. SHILLINGTON.

Copies of this patent may be obtained for five cents each, by addressing the "Commissioner of Patents, Washington, D. C."